(12) United States Patent
Lin et al.

(10) Patent No.: US 9,743,045 B2
(45) Date of Patent: Aug. 22, 2017

(54) AUTOMATIC AUDIO-VIDEO SWITCHING (71) Applicant: Airtime Media, Inc., New York, NY (US)

(72) Inventors: Andrew C. Lin, Brooklyn, NY (US); Walton Lin, New York, NY (US)

(73) Assignee: AIRTIME MEDIA, INC., New York, NY (US)

( * ) Notice: Subject to any disclaimer, the term of this patent is extended or adjusted under 35 U.S.C. 154(b) by 0 days.

(21) Appl. No.: 15/158,929

(22) Filed: May 19, 2016

(65) Prior Publication Data

US 2016/0373698 A1    Dec. 22, 2016

Related U.S. Application Data

(63) Continuation of application No. 14/618,716, filed on Feb. 10, 2015, now Pat. No. 9,372,550.

(60) Provisional application No. 61/937,979, filed on Feb. 10, 2014.

(51) Int. Cl.
| | |
|---|---|
| *H04N 7/14* | (2006.01) |
| *H04N 7/15* | (2006.01) |
| *G06F 3/0346* | (2013.01) |
| *H04M 1/725* | (2006.01) |
| *H04W 4/02* | (2009.01) |
| *G06T 13/80* | (2011.01) |
| *H04N 5/232* | (2006.01) |

(52) U.S. Cl.
CPC ......... *H04N 7/157* (2013.01); *G06F 3/0346* (2013.01); *G06T 13/80* (2013.01); *H04M 1/72519* (2013.01); *H04M 1/72563* (2013.01); *H04N 7/142* (2013.01); *H04N 7/144* (2013.01); *H04N 7/147* (2013.01); *H04W 4/023* (2013.01); *H04M 2250/12* (2013.01); *H04M 2250/52* (2013.01); *H04N 5/23293* (2013.01); *H04N 2007/145* (2013.01)

(58) Field of Classification Search
CPC ....................................................... H04N 7/14
USPC .......... 348/14.01, 14.02, 14.12, 14.11, 14.16
See application file for complete search history.

(56) References Cited

U.S. PATENT DOCUMENTS

| 8,947,491 B2* | 2/2015 | Rosenberg ........ H04M 1/72555 348/14.03 |
|---|---|---|
| 2007/0298827 A1* | 12/2007 | Hansson ............. H04M 1/0285 455/550.1 |
| 2014/0085201 A1* | 3/2014 | Carmel-Veilleux ... G06F 1/1694 345/158 |
| 2014/0292998 A1* | 10/2014 | Toga ................. H04M 1/72569 348/14.02 |

* cited by examiner

*Primary Examiner* — Olisa Anwah
(74) *Attorney, Agent, or Firm* — Perkins Coie LLP (57) ABSTRACT

A technique is disclosed for automatic switching of a mobile device between a videoconference operating mode and a teleconference operating mode, where the automatic switching is based on a detected functional use and current position of the device in relation to a user of the device. In at least some embodiments, the disclosed technology includes a video-audio switching system that works in coordination with a sensor mechanism associated with the device to enable the automatic switching. The technology disclosed herein enables the user to carry out a conversation via the device (i.e., conference session) without interruption when transitioning between different settings, (e.g., using the device while sitting at an office to using it while on-the-go to an appointment).

24 Claims, 6 Drawing Sheets

FIG. 6

AUTOMATIC AUDIO-VIDEO SWITCHING

CROSS-REFERENCE TO RELATED APPLICATIONS

This application is a continuation of U.S. patent application Ser. No. 14/618,716, filed Feb. 10, 2015, entitled "AUTOMATIC AUDIO-VIDEO SWITCHING", which claims the benefit of U.S. Provisional Patent Application No. 61/937,979 filed Feb. 10, 2014, entitled "AUTOMATIC AUDIO-VIDEO SWITCHING", all of which are expressly incorporated by reference herein.

BACKGROUND

Mobile devices, such as smartphones and personal digital assistants (PDAs), are versatile computing machines that provide users the ability to communicate with one another. The devices' mobile capability allows users to communicate in settings beyond those of traditional, land line telephones, i.e., on-the-go, in any setting. For example, a user can make a teleconference call while walking using a mobile device. The same user can later change to a videoconference call using the same mobile device.

For each type of call, however, the user is required to interact manually with the device in order to carry out the operation (e.g., punch in keypresses to activate video camera for a videoconference). Such manual interaction is disadvantageous as it requires the user to look at the device; this is cumbersome when the user is transitioning between different settings during a conversation (e.g., driving, walking, multitasking, etc.). Another disadvantage is that a time lag will likely result in order for actual execution of the appropriate operation to occur, preventing the user from having a seamless conversation via the device.

BRIEF DESCRIPTION OF THE DRAWINGS

One or more embodiments of the present invention are illustrated by way of example and are not limited by the figures of the accompanying drawings, in which like references indicate similar elements.

DETAILED DESCRIPTION

References in this description to an embodiment", one embodiment", or the like, mean that the particular feature, function, structure or characteristic being described is included in at least one embodiment of the present invention. Occurrences of such phrases in this specification do not necessarily all refer to the same embodiment. On the other hand, such references are not necessarily mutually exclusive.

General Description

Introduced herein is a technology for automatic switching of a mobile device between a videoconference operating mode and a teleconference operating mode, where the automatic switching is based on a detected functional use and current position of the device in relation to a user of the device. The technology disclosed herein enables the user to carry out a conversation via the device without interruption when transitioning between different settings (where each setting may place the device in a different position unsuitable for a current operating mode).

The term "setting," as used herein, refers to a context, or an environment, under which the user utilizes the mobile device. For example, the setting can be the device being held at a distance away from the user's ear. In such setting, the user is likely using the device, for example, to conduct a videoconference session while sitting in an office. In another example, the setting can be the device being used inside a pocket or a bag of the user, where a hands-free headset or a speakerphone of the device is enabled to permit communication via the device. In this setting, the user is likely using the device, for example, to conduct a teleconference session while on-the-go (e.g., transitioning from the office to another meeting or appointment).

In at least some embodiments, the disclosed technology includes a video-audio switching system that facilitates the automatic switching of a mobile device's operating mode to enable communication via the device without interruption. A mobile device often includes one or more operating modes for which the user can activate to accommodate the setting in which the user utilizes the device. For example, a videoconference-enabled mode activates the device's camera function to enable transmission of video and audio from the user to other users in a videoconference session. In another example, a teleconference-enabled mode activates the device's speaker function to receive audio in a teleconference session.

In at least some embodiments, the video-audio switching system works in coordination with a sensor mechanism associated with the device to enable the automatic switching. The sensor mechanism is configured to detect and transmit a signal indicative of a current position of the device in relation to the user. The detection mechanism can include one or more sensors configured to detect various attributes associated with the current position. The sensor mechanism can include a proximity sensor that detects the position, or proximity, of the mobile device in relation to one or more specified spatial areas associated with the user's body. The various attributes can include, for example, a proximity measurement, such as a proximate distance between the device and a user of the device (e.g., x-distance proximate to the user's or the user's ear) or a proximate location of the device in relation to the user (e.g., x, y, z coordinates of a three-dimensional space). The various attributes can also include an acceleration measurement (e.g., acceleration associated with movement of the device) or an orientation measurement (e.g., an upright orientation, a sideway orientation, upside down orientation).

In at least some embodiments, the video-audio switching system, in response to the current position detected by the sensor mechanism, activates a particular operating mode that corresponds to the current position. That is, the user does not need to manually execute a key sequence (e.g., keypresses) in order to have the device operate under the appropriate mode. In at least some embodiments, the video-audio switching system analyzes the device's position as an indication of a particular setting, or context, in which the user is utilizing the device. For example, when the device is detected as being sideway and away from the user's ear (e.g., in user's pocket), the video-audio switching system correlates the position to an indication that the device is likely being used for a teleconference session.

In at least some embodiments, the video-audio switching system automatically switches the mobile device between the different operating modes seamlessly in response to the detected current position. Upon receiving a signal from the sensor mechanism, the video-audio switching system determines whether a current functional use of the device, i.e., the current operating mode, corresponds to the position detected by the sensor mechanism. For example, if the device is operating under videoconference mode, but the current position indicates that the device is oriented proximate to the user's ear, the video-audio switching system automatically switches the device to teleconference mode. In such example, the video-audio switching system analyzes the detected position to be unfit for use in a videoconference mode, and causes the device to switch to teleconference mode. Referring to the same example, if the video-audio switching system receives from the sensor mechanism a new updated signal indicating the device is oriented in a position fit for a videoconference, the system will automatically switch the device back to videoconference mode.

In at least some embodiments, the automatic switching of the mobile device to teleconference mode includes rerouting the sound transmission of the conference session. The rerouting includes directing the sound transmission from the device's speakerphone to the speaker at the user's ear to correspond with the current position detected. In some embodiments, the sound transmission is rerouted from the speakerphone to a hands-free headset connected to the device.

In at least some embodiments, the automatic switching of the mobile device to teleconference mode includes deactivating unnecessary videoconference related capabilities of the device. For example, the camera capability is deactivated, or turned off, when teleconference mode is enabled.

In at least some embodiments, the automatic switching of the mobile device to teleconference mode includes generating an avatar of the user. The generated avatar replaces a video image of the user in the previous videoconference session. One advantage of having the avatar is being able to provide a more natural transition for the user in the video chat. For example, instead of a missing video live stream of the user's face, the avatar is displayed to the other users of the videoconference when the user switches to teleconference mode. In some embodiments, the avatar can emulate facial expressions of the user speaking, wherein the facial expressions correspond to the audio being transmitted to the other users in the videoconference.

In at least some embodiments, the automatic switching of the mobile device to videoconference mode includes rerouting the sound transmission of the conference session. The rerouting includes directing the sound transmission from the device's ear speaker to the speakerphone to correspond to the current position detected. In some embodiments, the sound transmission is rerouted from a hands-free headset connected to the device to the speakerphone.

In at least some embodiments, the automatic switching of the mobile device to videoconference mode includes activating certain videoconference related capabilities of the device. For example, the camera capability is activated, or turned on, when videoconference mode is enabled.

The technology disclosed herein provide many advantages. One advantage is automatic mode switching for the mobile device without the user having to manually press a button or a sequence of keys to transition between different settings. Another advantage is preservation of resources associated with the mobile device. For example, when in teleconference mode, the video-audio switching system deactivates the camera and the speakerphone of the device as they are no longer in use; such deactivation saves battery life and prolongs the life of the device components. Another advantage of the disclosed technology is a seamless transition presented to a user when the mobile device is transitioning between teleconference and videoconference modes, such that the user's communication session is uninterrupted. For example, when switching from videoconference to teleconference mode, the user's video camera feed is replaced automatically with an avatar to allow a natural progression of the videoconference to continue.

Other aspects and advantages of the disclosed technology will become apparent from the following description in combination with the accompanying drawings, illustrating, by way of example, the principles of the disclosed technology.

Figure 1:
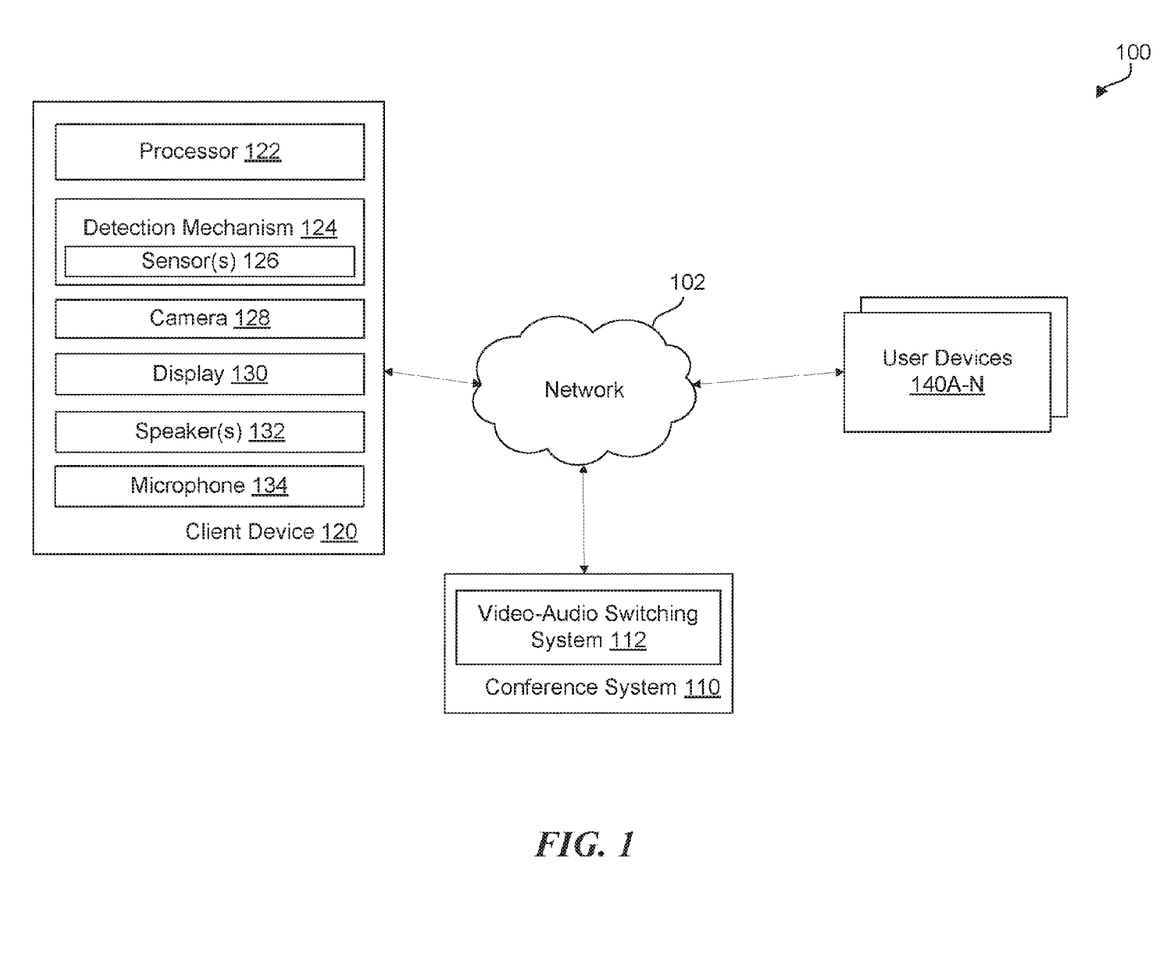
FIG. 1 illustrates an environment in which various embodiments of the audio-video switching technology can be implemented.

FIG. 1 is a block diagram of an environment 100 in which various embodiments of the video-audio switching technology can be implemented. Although the diagram depicts components as functionally separate, such depiction is merely for illustrative purposes. It will be apparent to one of ordinary skill in the art that the components portrayed in this figure can be arbitrarily combined or divided into separate software, firmware, and/or hardware components. Furthermore, it will also be apparent to one of ordinary skill in the art that such components, regardless of how they are combined or divided, can execute on the same host or multiple hosts, and wherein multiple hosts can be connected by one or more networks.

It is noted that while the discussion focuses on operating modes corresponding to videoconference and/or teleconference sessions, other operating modes associated with the device may also benefit from the technology disclosed herein; that is, the technology is applicable to enable automatic switching between various operating modes of the device based on detection of the mobile device's position (e.g., proximity, orientation, etc.).

The environment 100 includes a conference system 110 that facilitates one or more conference sessions (i.e., videoconferences and/or teleconferences) taking place between two or more users, such as between a first user using a first client device 120 and other users (e.g., second user, third user, etc.) using respective client devices 140A-N (e.g., second device, third device, etc.). For example, the first user, via the first client device 120, can send a request to the conference system 110 to initiate a videoconference session, or "video chat," with one or more other users. In response, the conference system 110, can facilitate the video chat by connecting the client device 120 to respective client devices 140A-N of the one or more users.

The communication between the client devices 120, 140A-N and the conference system 110 can occur over a communication network 102. The communication network 102 can be of various types, including a local area network, a wide area network, the Internet, or a public switched telephone network.

The client devices 120, 140A-N can be any general-purpose devices with data processing and data communication capabilities. For example, the first client device 120 can be a mobile phone, a tablet, an e-reader, or any other mobile or portable computing devices. The first client device 120 can include, for example, two-way communication devices with advanced data communication capabilities. The client device 120 can have the capability to allow voice and video conversations (e.g., video chat or audio chat) with other voice/video capable devices, such as an internet telephone, another client device 140A, or the like. Each of the client devices 140A-N can be a mobile computing device, similar to the first client device 120, or any other non-mobile computing device, such as a desktop computer, with data processing and data communication capabilities.

The first client device 120 can include a processor 122, a detection mechanism 124, a camera 128, a display 130, one or more speaker(s) 132, and a microphone 134. The display 130 can include a display screen, such as a liquid crystal display (LCD) or an organic light emitting diode display (OLED). The one or more speaker(s) 132 can include a speakerphone, an ear speaker, or a speaker module for relaying audio to an external speaker. The external speaker can be, for example, an ear bud of a hands-free headset.

The detection mechanism 124 can be any combination of software and/or hardware. In some embodiments, the detection mechanism 124 works in coordination with the processor 122 to execute instructions received from the conference system 110. The detection mechanism 124 can include one or more sensors 126 configured to detect an operating position of the client device 120. The sensors 126 can include a proximity sensor configured to detect a proximate distance of the client device 120 in relation to an operator, or user, of the device. While a proximity sensor is sufficient to detect the device's position, other sensors can be used in combination with the proximity sensor in other embodiments. The other types of sensors can include, for example, a gyroscope, an accelerometer, and the like.

In some embodiments, the detection mechanism 124 can generate and transmit to the video-audio switching system 112 a signal indicative of a position of the device using the sensors 126. In one example, the signal can include an orientation measurement of the device relative to the user. The orientation measurement can be, for example, upside-down, right side up, sideways, or any other orientation. In another example, the signal can include a proximity of the device relative to a user of the device. The proximity can include, for example, a quantification of a distance between the device and the user. In some embodiments, the proximity sensor can be configured to incorporate a time delay in detecting the proximity to prevent "false alarm" detection. The time delay is useful, for example, when a user's finger temporarily passes over the proximity sensor. In such instance, the proximity sensor waits for a predetermined time (e.g., 700 milliseconds)—ensuring that proximity persists in the predetermined time—before concluding the device is within proximate contact with a particular user (or object, body mass, etc.). The delay mechanism can be incorporated into the processor 122 instead.

In some embodiments, the conference system 110 includes a video-audio switching system 112 (or "switching system") configured to facilitate automatic switching of the operating modes based on the signal from the detection mechanism 124. In some embodiments, the switching system 112 is an external system that works in coordination with the conference system 110 to facilitate the automatic switching capability. The switching system 112 causes the first client device 120 to alternate, or switch, between a videoconference operating mode (or, "video mode") and a teleconference operating mode (or, "audio mode") in response to the device 120 transitioning between different settings during a conference session (or "conference call"). As discussed above, a setting refers to an environment or context in which the device is being used in relation to the user.

In some embodiments, the switching system 112 works in coordination with the processor 122 and the detection mechanism 124 of the client device 120 to facilitate the automatic switching. The switching system 112 first determines a particular setting of the device 120 based on a signal indicative of the device's position, or orientation, in relation to the user using the device. For example, where the client device 120 is identified as being in a position away from the user, the switching system 112 correlates such position to a setting associated with the device being used for a videoconference session. Such correlation is based on, for example, a logic that the device's position allows the device's camera to capture real-time video footage of the user (e.g., device being away from user's face). The logic may be configured by an operator of the switching system 112.

In response to the detected current position, the switching system 112 determines a current functional use of the device, and determines whether such use corresponds to the current position. If the current functional use corresponds to the current position, then the switching system 112 takes no action. If the current functional use does not correspond to the current position, then the switching system 112 works with the processor 122 to cause the operating mode of the device 120 to alternate, or switch, to an operating mode that places the functional use of the device 120 in accordance with the current position.

Figure 2:
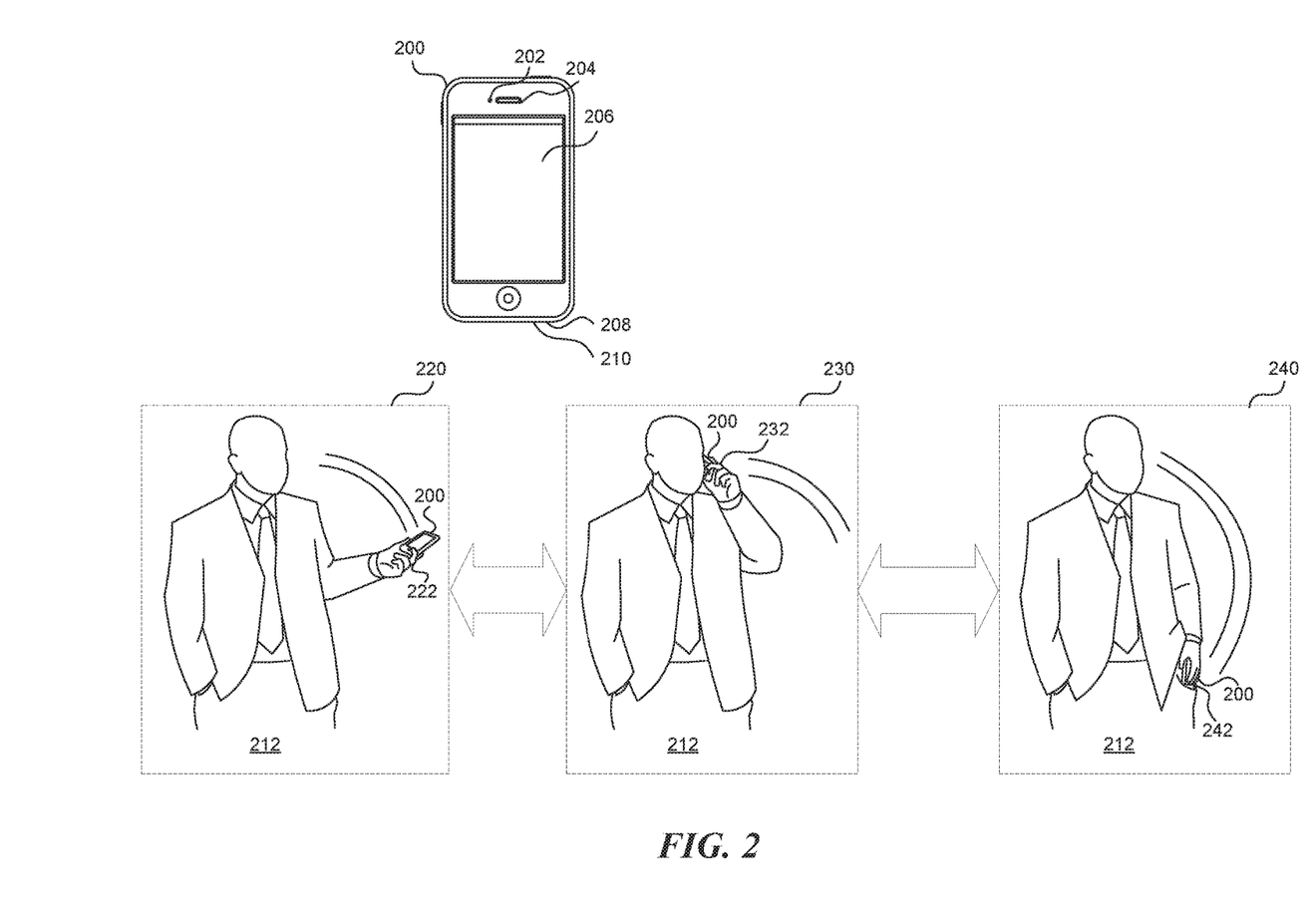
FIG. 2 illustrates conceptually the audio-video switching technology being utilized in association with a smartphone.

FIG. 2 illustrates the audio-video switching technology being utilized in association with a mobile device 200, such as an iPhone®, according to some embodiments. The mobile device 200 includes a camera 202, an ear speaker 204, a display 206, a speakerphone 208, and a microphone 210. A User X 212 can utilize the mobile device 200 to conduct a conference session with one or more other users, e.g., User Y and User Z (not shown).

As discussed above, the mobile device 200 can work in coordination with a video-audio switching system to facilitate smooth operation of the device 200 when transitioning between different settings during a conference session (i.e., where the device assumes different positions while participating in the session). The conference session can be, for example, a videoconference session or a teleconference session.

For illustrative purposes, consider scenarios 220, 230, and 240 to be demonstrative of different settings between which User X can transition while participating in a conference session with Users Y and Z. During each scenario, the video-audio switching system can detect a current position and a current operating mode of the mobile device 200, and causes, in response to such detection, the mobile device to switch to an appropriate operating mode to provide a seamless transition for the user during the conference session.

In scenario 220, consider an example where User X 212 initiates video mode in the mobile device 200 to start a videoconference session (or "video chat") with Users Y and Z. To carry out the video chat, the User X places the phone at a position 222, away from the user's face, such that the camera 202 of the device 200 is able to detect, record, and transmit a live image of the user for the video chat. In scenario 220, the video-audio switching system detects such position 222 and the current operating mode of the mobile device 200. In some embodiments, the video-audio switching system detects the position 222 based on a signal received from a detection mechanism (e.g., detection mechanism 124 of FIG. 1) coupled to the video-audio switching system. Based on the detected position 222 (i.e., away from User X) and the detected current operating mode (i.e., video mode), the video-audio switching system determines whether the video mode corresponds to the detected position 222.

The determination whether the operating mode corresponds to the detected position can be based on a configurable logic. In some embodiments, the logic can be changed, or updated, by an operator of the video-audio switching system. The logic can be, for example, if the position is x-distance from the user, where the x-distance exceeds a threshold (e.g., 3 feet), then video mode is the appropriate operating mode (e.g., initiate video mode). In yet another example, the logic can be if the position is x-distance from the user and oriented in y-orientation, then video mode is the appropriate operating mode. The logic can also be based on a predetermined threshold. For example, the logic can include a determination that if the x-distance, between the device and the user, exceeds a threshold (e.g., 3 feet), then video mode is the appropriate operating mode (e.g., initiate video mode); otherwise, the audio mode is the appropriate operating mode (where the y-distance from the floor can be as high as the ear level or as low as the pocket level). In another example, the logic can include a determination that if the orientation exceeds a certain axis by z-degrees, then an audio mode is the appropriate operating mode. Other variations and/or combinations of these features can be readily apparent to one of ordinary skill in the art based on the disclosure here.

Following the logic, the video-audio switching system determines in scenario 220 that position 222 corresponds to the current video mode. The video-audio switching system maintains the video mode and does not interfere with the mobile device's functioning operations.

Consider another example for scenario 220, where User X starts out initiating an audio mode to start a teleconference, or voice chat (instead of a video chat) with Users Y and Z. In such example, the video-audio switching system detects the position 222 and the current operating mode (i.e., audio mode), determines that the operating mode does not correspond with the position 222 (i.e., corresponds with video mode), and causes, in response to such determination, the mobile device 200 to switch to video mode. This switching can include, for example, rerouting the audio transmission from the small ear speaker 204 to the speakerphone 208 and activating the camera 202.

In scenario 230, consider an example where User X 212 starts out in video mode, continues the video chat with Users Y and Z, and transitions into a different setting by placing the mobile device 200 in position 232, next to the user's ear. Similar to scenario 220, the video-audio switching system determines whether the current operating mode of the device 200 corresponds to the position 232. In such position 232, the video-audio switching system determines that the camera 202 of the device 200 is effectively blocked, unable to detect, record, or transmit a live image of User X. This determination can be based on various logic that is configurable, for example, by an operator of the video-audio switching system.

In the position 232, the video-audio switching system determines that the video mode, which has been initially started by User X, is no longer an appropriate operating mode. In response, the video-audio switching system causes the mobile device 200 to switch to an audio mode. The switching can include, for example, rerouting the audio transmission from the speakerphone 208 to the small ear speaker 204, deactivating the camera 202, and/or generating an avatar for transmission and display to the Users Y and Z in the conference session. In some embodiments, the avatar can indicate that User X has the phone by his or her ear or otherwise is only listening to the audio without watching any video. In some embodiments, the avatar can emulate facial expressions of User X based on the audio received via the microphone 210, including a tone of the voice or the speech contained in the voice, to show what User X might be feeling or speaking.

In scenario 240, consider an example where User X transitions into yet another setting by moving the mobile device 200 from position 232 to position 242, away from the user's ear (i.e., into User X's pocket). Similar to scenarios 220, 230, the video-audio switching system determines whether the current operating mode corresponds with the detected position 242. In the position 242, the video-audio switching system determines that the camera 202 of the device 200 is effectively blocked, unable to detect, record, or transmit a live image of User X, determines that the audio mode is the appropriate operating mode, and maintains the audio mode for the device 200. This determination can be based on various logic configurable, for example, by an operator of the video-audio switching system. The logic can include, for example, if the device 200 is at an x-distance away from User X, where the x-distance is within a threshold (e.g., three inches), then initiate audio mode. In the example of scenario 240, the video-audio switching system causes the device to maintain the audio mode (from previous position 232) as such mode corresponds to the position 242.

Figure 3:
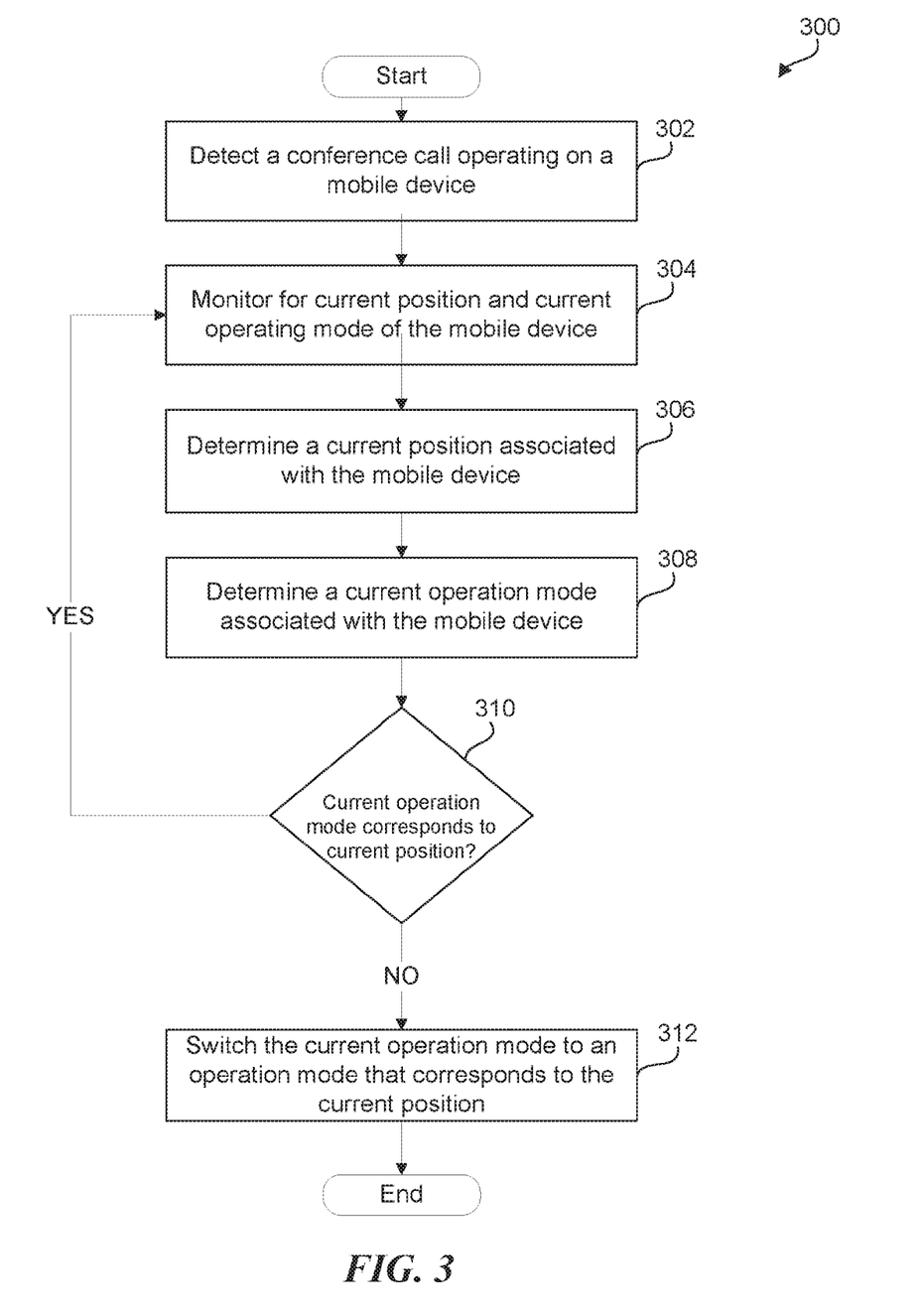
FIG. 3 illustrates a first embodiment of a process for managing audio and video modes associated with a mobile device during a videoconference.

FIG. 3 illustrates a first embodiment of a process 300 for managing audio and video modes associated with a user device during a conference session. The process 300 can be executed by a video-audio switching system of a conference system (e.g., the conference system 110 of FIG. 1), or a video-audio switching system that is external to the conference system and works in coordination with the conference system and the user device, or a video-audio switching mobile application installed on the user device.

At step 302, the video-audio switching system (or "VAS system") detects a conference call is operating on a mobile device. In particular, the VAS system determines the type of conference call currently taking place on the device. The type of conference call can be, for example, a videoconference call or a teleconference call. Determination of an active conference call causes the VAS system to start monitoring the current position of the device and the current operation mode of the device, as indicated in step 304.

At step 306, the VAS system determines a current position associated with the conference call operating on the mobile device. The VAS system can determine the current position by, for example, receiving a signal indicative of the position from a detection system associated with the device (e.g., detection mechanism 124 of FIG. 1).

At step 308, the VAS system determines a current operation mode of the device. The operation mode can include, for example, a video mode (i.e., an operation mode activating videoconference-related functional components of the device) or an audio mode (i.e., an operation mode activating teleconference-related functional components of the device).

At step 310, the VAS system determines whether the current operation mode corresponds to the current position. At step 312, in response to determining that the current operation mode does not correspond (i.e., not the appropriate mode), the VAS system causes the mobile device to switch mode to an appropriate operation mode. If the current operation mode corresponds to the current position, the VAS system continues monitoring the current position and the current operation mode, as indicated in step 304.

Figure 4:
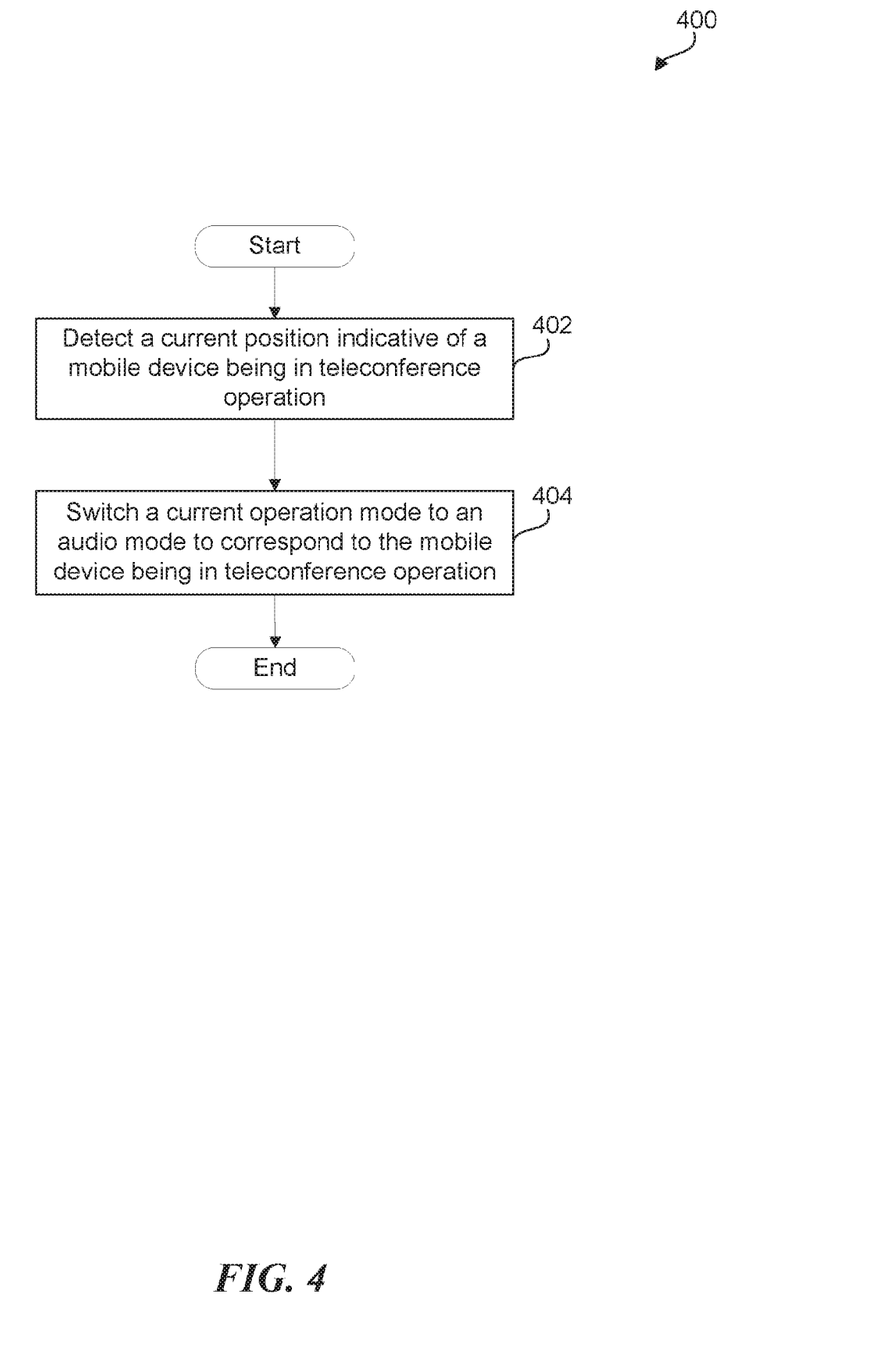
FIG. 4 illustrates a second embodiment of a process for managing audio and video modes associated with a mobile device during a videoconference.

FIG. 4 illustrates a second embodiment of a process 400 for managing audio and video modes associated with a user device during a videoconference. The process 400 can be executed by a video-audio switching system of a conference system (e.g., the conference system 110 of FIG. 1), or a video-audio switching system that is external to the conference system and works in coordination with the conference system and the user device, or a video-audio switching mobile application installed on the user device.

At step 402, the video-audio switching system ("VAS system") detects a current position indicative of the mobile device operating to enable participation in a teleconference. The current position can be based on a signal from a detection system (e.g., detection mechanism 124 of FIG. 1). The current position can include, for example, the device being within a proximately close distance to a user of the device, such as being next to the user's ear. The VAS system determines such position is indicative of the device being used for a voice-related call (e.g., a teleconference session). As discussed above, such determination can be based on a configurable logic associated with the VAS system. For example, the logic can include setting a position proximately close to the user to indicate that the device is currently being used for a teleconference. At step 404, the VAS system causes the device to switch to an audio mode to correspond to the device being in teleconference operation.

Figure 5:
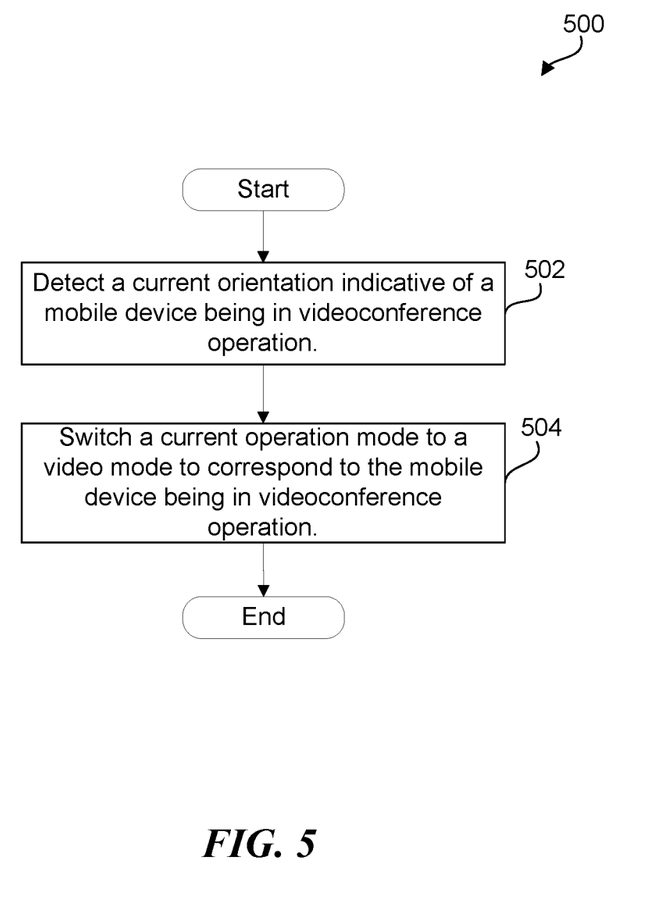
FIG. 5 illustrates a third embodiment of a process for managing audio and video modes associated with a mobile device during a videoconference.

FIG. 5 illustrates a third embodiment of a process 500 for managing audio and video modes associated with a user device during a videoconference. The process 500 can be executed by a video-audio switching system of a conference system (e.g., the conference system 110 of FIG. 1), or a video-audio switching system that is external to the conference system and works in coordination with the conference system and the user device, or a video-audio switching mobile application installed on the user device.

At step 502, the video-audio switching system ("VAS system") detects a current position indicative of the mobile device operating to enable participation in a videoconference. The current position can be based on a signal from a detection system (e.g., detection mechanism 124 of FIG. 1). The current position can include, for example, the device being at a distance away from a user of the device, such as being away from the user's ear. The VAS system determines such position is indicative of the device being used for a video-related call (e.g., a videoconference session). As discussed above, such determination can be based on a configurable logic associated with the VAS system. For example, the logic can include setting a position that is away from the user (above a predetermined threshold) to indicate that the device is currently being used for a videoconference. At step 504, the VAS system causes the device to switch to a video mode to correspond to the device being in videoconference operation.

Regarding the processes 300, 400, and 500, while the various steps, blocks, or sub-processes are presented in a given order, alternative embodiments can perform routines having steps, or employ systems having steps, blocks or sub-processes, in a different order. Further, some steps, sub-processes or blocks can be deleted, moved, added, subdivided, combined, and/or modified to provide alternatives or sub-combinations. Each of these steps, blocks or sub-processes can be implemented in a variety of different ways. Also, while the steps, sub-processes or blocks are at times shown as being performed in series, some steps, sub-processes, or blocks can be performed, instead, in parallel or at different times, as will be readily recognized by a person of ordinary skill in the art in light of the disclosure herein. Additionally, any specific numbers noted herein are only by example as alternative implementations can employ differing values or ranges.

Figure 6:
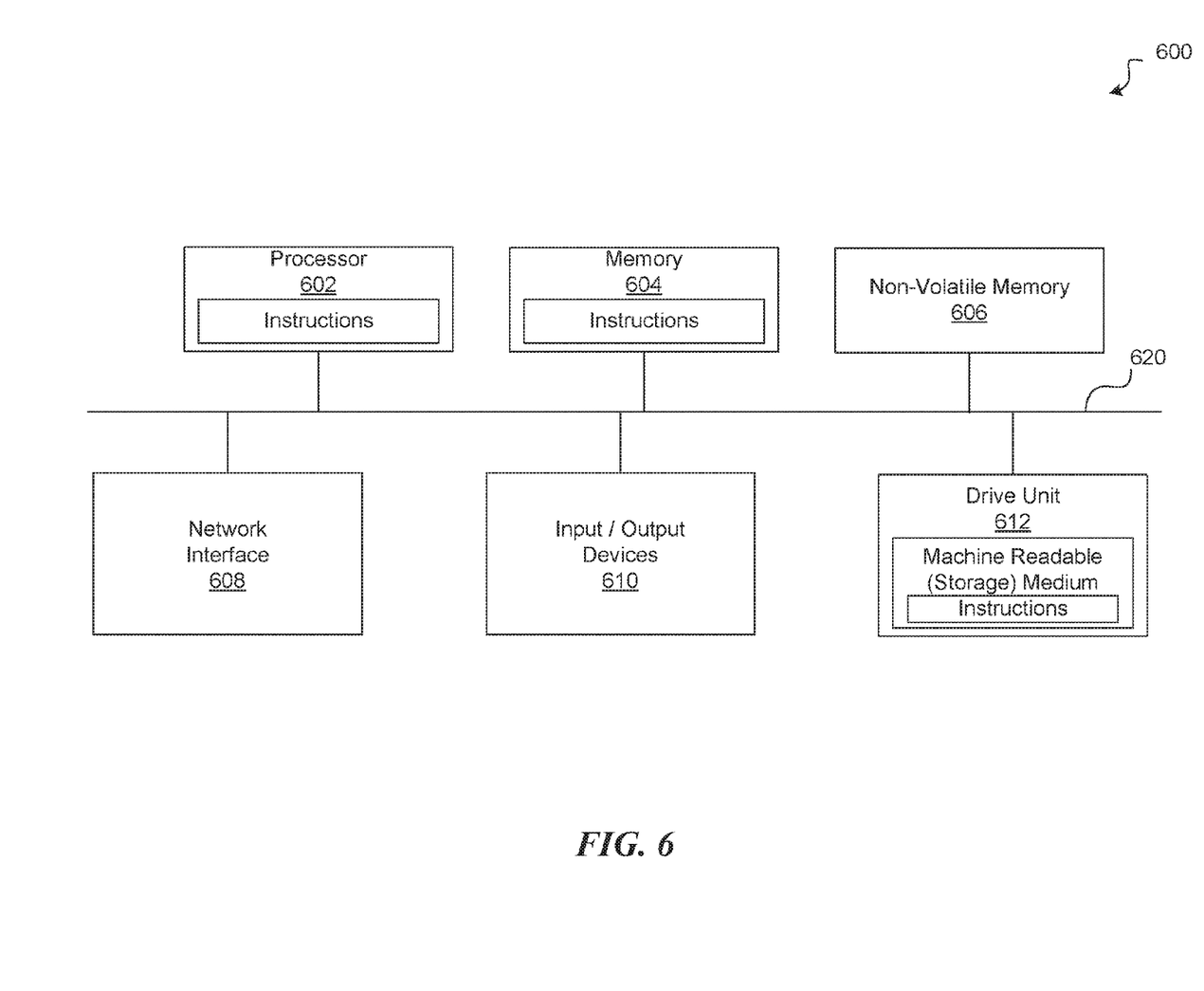
FIG. 6 illustrates a computer system that can be utilized to perform various techniques disclosed herein.

FIG. 6 illustrates a computer system 600 that can be utilized to perform various techniques disclosed herein. The computer system 600 includes a processor 602, a memory 604, non-volatile memory 606, a network interface 608, input/output (I/O) devices 610, and a drive unit 612. Various common components (e.g., cache memory) are omitted for illustrative simplicity.

The computer system 600 is intended to illustrate a hardware device on which any of the components depicted in FIGS. 1-5 (and any other components described in this specification) can be implemented. For example, the components can include the conference system 110 of FIG. 1, the video-audio switching system 112 of FIG. 1, or the user devices 120, 140A-N. The computer system 600 can be of any applicable known or convenient type. The components of the computer system 600 can be coupled together via a bus 620 or through some other known or convenient device.

The computer system 600 can be embodied in any suitable physical form. For example, the computer system 600 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 can include one or more computer systems 600; be unitary or distributed; span multiple locations; span multiple machines; or reside in a cloud, which can include one or more cloud components in one or more networks. Where appropriate, one or more computer systems 600 can perform without substantial spatial or temporal limitation one or more steps of one or more methods described or illustrated herein. For example, one or more computer systems 600 can perform in real time or in batch mode one or more steps of one or more methods described or illustrated herein. The one or more computer systems 600 can perform at different times or at different locations one or more steps of one or more methods described or illustrated herein, where appropriate.

The processor 602 can be a conventional microprocessor, such as an Intel Core microprocessor, an Intel Itanium microprocessor, a Motorola power PC microprocessor, or a SPARC architecture processor. One of skill in the relevant art will recognize that the terms "machine-readable (storage) medium" or "computer-readable (storage) medium" include any type of device that is accessible by the processor.

The memory 604 is coupled to the processor 602 by, for example, a bus. The memory 604 can include, for example, random access memory (RAM), such as dynamic RAM (DRAM) or static RAM (SRAM). The memory can be local, remote, or distributed.

The bus 620 also couples the processor 602 to the non-volatile memory 606 and the drive unit 612. The non-volatile memory 606 can be, for example, a magnetic floppy or hard disk, a magnetic-optical disk, an optical disk, a flash memory such as NAND flash memory or NOR flash memory, a read-only memory (ROM) such as a CD-ROM, a programmable read-only memory such as EPROM or EEPROM, a magnetic or optical card, or another form of storage for large amounts of data. Some of this data is often written, by a direct memory access process, into memory during execution of software in the computer 600. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, storing the entire program in memory can not even be possible. Nevertheless, one should understand that for software to run, if necessary, the software is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus 620 also couples the processor 602 to the network interface device 608. The interface 608 can include one or more of a modem or network interface. A person of ordinary skill will appreciate that a modem or network interface can be considered to be part of the computer system 600. The interface 608 can include an analog modem, ISDN modem, cable modem, token ring interface, satellite transmission interface (e.g., "direct PC"), Wi-Fi interface, or other interfaces for coupling a computer system to other computer systems. The interface can include one or more input and/or output devices.

The I/O devices 610 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device. For simplicity, this disclosure assumes that controllers of any devices not depicted in the example of FIG. 6 reside in the interface.

The computer system can have one Bus or multiple Buses. The bus 620 can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB, USB 2.0, USB 3.0), IIC (I2C) bus, an Institute of Electrical and Electronics Engineers (IEEE) standard 1394 bus, also called "Firewire," a QuickPath Interconnect bus, a ThunderBolt interconnect bus, a DisplayPort interconnect bus or its companion standards Mini DisplayPort (mDP), Direct Drive Monitor (DDM), Embedded DisplayPort (eDP), Internal DisplayPort (iDP), Portable Digital Media Interface (PDMI), Wireless DisplayPort (wDP), and Mobility DisplayPort (MyDP), an HDMI interconnect bus, a DVI bus.

In operation, the computer system 600 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules can be embodied in software, firmware, hardware, or any combinations thereof.

Any of the steps, operations, or processes described herein can be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention can also relate to an apparatus for performing the operations herein. This apparatus can be specially constructed for the required purposes, and/or it can comprise a general-purpose computing device selectively activated or reconfigured by a computer program stored in the computer. Such a computer program can be stored in a non-transitory, tangible computer readable storage medium, or any type of media suitable for storing electronic instructions, which can be coupled to a computer system bus. Furthermore, any computing systems referred to in the specification can include a single processor or can be architectures employing multiple processor designs for increased computing capability.

Embodiments of the invention can also relate to a product that is produced by a computing process described herein. Such a product can comprise information resulting from a computing process, where the information is stored on a non-transitory, tangible computer readable storage medium and can include any embodiment of a computer program product or other data combination described herein.

Finally, the language used in the specification has been principally selected for readability and instructional purposes, and it can not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, at a video-audio switching system and from a detection mechanism of a mobile device, a signal indicative of a position of the mobile device, the position including an orientation of the mobile device and a proximity of the mobile device relative to a user of the mobile device;
   determining, by the video-audio switching system, that the position of the mobile device corresponds to an audio mode;
   determining, by the video-audio switching system, whether a current operating mode of the mobile device corresponds to the audio mode; and
   responsive to a determination that the current operating mode does not correspond to the audio mode, automatically switching, by the video-audio switching system, the current operating mode of the mobile device to the audio mode, wherein switching to the audio mode includes causing the mobile device to output audio from a first output device of the mobile device instead of from a second output device of the mobile device.

2. The method of claim 1, wherein determining that the position corresponds to the audio mode includes:
   determining, via a sensor of the mobile device, the proximity as a distance of the mobile device from the user, and
   determining that the distance is within a specified threshold.

3. The method of claim 2, wherein determining the proximity includes:
   configuring the sensor to incorporate a time delay in determining the proximity, and determining the proximity after the time delay.

4. The method of claim 1, wherein determining that the position corresponds to the audio mode includes:
   determining, via a sensor of the mobile device, a distance of the mobile device from the user, and
   determining that the distance is within a first specified threshold and the orientation exceeds a specified axis by a specified degree.

5. The method of claim 1, wherein determining that the position corresponds to the audio mode includes determining that a camera of the mobile device is blocked or unable to capture or transmit live image of the user.

6. The method of claim 1, wherein determining that the position corresponds to the audio mode includes determining based on a configurable logic programmed in the video-audio switching system.

7. The method of claim 1, wherein the first output device includes an ear speaker of the mobile device and the second output device includes a speakerphone of the mobile device.

8. The method of claim 1 further comprising:
   disabling a camera associated with the mobile device.

9. The method of claim 1 further comprising:
   causing the mobile device to continue operating in the audio mode until the position of the mobile device corresponds to the audio mode.

10. A non-transitory computer-readable storage medium storing computer-readable instructions for alternating between audio and video modes during a videoconference, comprising:
    instructions for detecting a videoconference call initialized on a mobile device;
    instructions for confirming, in response to detecting the videoconference call, that a first position of the mobile device is indicative of a video mode, the first position being relative to a user relative to a user using the mobile device;
    instructions for initializing, in response to the confirming, the video mode to place the mobile device in videoconference operation;
    instructions for detecting, via a proximity sensor of the mobile device, that a position of the mobile device changed to a second position relative to the user, the second position indicative of an audio-mode; and
    instructions for automatically switching, in response to the detecting of the change in position, the mobile device from the video mode to the audio mode to place the mobile device in a teleconference operation.

11. The computer-readable storage medium of claim 10, wherein the instructions for initializing the video mode include:
    instructions for enabling a camera associated with the mobile device to capture a live video image of the user; and
    instructions for outputting an audio signal of the videoconference call from a first speaker of a plurality of speakers of the mobile device.

12. The computer-readable storage medium of claim 11, wherein the first speaker includes a speakerphone.

13. The computer-readable storage medium of claim 11, wherein the first speaker includes a hands-free headset.

14. The computer-readable storage medium of claim 10, wherein the instructions for confirming that the first position is indicative of the video mode include:
    instructions for determining that the first position enables a camera associated with the mobile device to capture a live video image of the user.

15. The computer-readable storage medium of claim 14, wherein the instructions for confirming that the second position is indicative of the audio mode include:
    instructions for determining that the second position prevents the camera from recording, capturing, or transmitting the live video image of the user.

16. The computer-readable storage medium of claim 10, wherein the instructions for confirming that the first position is indicative of the video mode include:
    instructions for determining that a distance between the mobile device and the user exceeds a specified threshold.

17. The computer-readable storage medium of claim 16, wherein the instructions for confirming that the second position is indicative of the audio mode include:
    instructions for determining that the distance between the mobile device and the user is below the specified threshold.

18. The computer-readable storage medium of claim 10, wherein the instructions for confirming that the first position is indicative of the video mode include:
    instructions for determining that an orientation of the mobile device is within a specified degree of a specified axis.

19. The computer-readable storage medium of claim 18, wherein the instructions for confirming that the second position is indicative of the audio mode include:
  instructions for determining that the orientation of the mobile device exceeds the specified axis by the specified degree.

20. The computer-readable storage medium of claim 10, wherein the instructions for automatically switching the mobile device from the video mode to the audio mode include:
  instructions for routing an audio signal of the videoconference call from a first speaker of a plurality of speakers of the mobile device to a second speaker of the plurality of speakers.

21. The computer-readable storage medium of claim 20, wherein the first speaker includes speakerphone and the second speaker includes an ear speaker.

22. The computer-readable storage medium of claim 10, wherein the instructions for automatically switching the mobile device from the video mode to the audio mode include:
  instructions for deactivating a camera of the mobile device.

23. The computer-readable storage medium of claim 10, wherein the instructions for automatically switching the mobile device from the video mode to the audio mode include:
  instructions for operating the mobile device in the audio mode until a position of the mobile device changes to the first position.

24. An apparatus, comprising:
  a detection mechanism configured to detect a position of a mobile device operated by a user;
  a camera to capture a live image of the user;
  a processor configured to initialize an audio mode or a video mode associated with the mobile device based on the position detected by the detection mechanism; and
  a video-audio switching system configured to:
    determine, based on a signal received from the detection mechanism, that a first position of the mobile device corresponds to the audio mode, the first position including an orientation of the mobile device and a proximity of the mobile device relative to the user,
    determine that a current operating mode of the mobile device corresponds to the video mode,
    automatically switch the current operating mode from the video mode to the audio mode, wherein the switching to the audio mode includes causing the mobile device to output audio from a first output device of the mobile device instead of from a second output device of the mobile device through which the audio is output during video mode,
    determine, based on the signal, that a position of the mobile device has changed to a second position, the second position corresponding to the video mode, and
    automatically switch the current operating mode of the mobile device from the audio mode to the video mode, wherein the switching to the video mode includes causing the mobile device to enable a camera of the mobile device to capture the live image of the user and output audio from the second output device instead of the first output device.

* * * * *